(12) United States Patent
Yamaguchi

(10) Patent No.: US 11,915,099 B2
(45) Date of Patent: Feb. 27, 2024

(54) INFORMATION PROCESSING METHOD, INFORMATION PROCESSING APPARATUS, AND RECORDING MEDIUM FOR SELECTING SENSING DATA SERVING AS LEARNING DATA

(71) Applicant: Panasonic Intellectual Property Corporation of America, Torrance, CA (US)

(72) Inventor: Takuya Yamaguchi, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 51 days.

(21) Appl. No.: 16/515,385

(22) Filed: Jul. 18, 2019

(65) Prior Publication Data

US 2020/0042803 A1 Feb. 6, 2020

(30) Foreign Application Priority Data

Aug. 1, 2018 (JP) .................................. 2018-145357

(51) Int. Cl.
 *G06K 9/00* (2006.01)
 *G06T 7/70* (2017.01)
 (Continued)

(52) U.S. Cl.
 CPC .............. *G06V 20/58* (2022.01); *G06T 7/70* (2017.01); *G06V 20/584* (2022.01);
 (Continued)

(58) Field of Classification Search
 None
 See application file for complete search history.

(56) References Cited

U.S. PATENT DOCUMENTS

| 11,023,775 B2* | 6/2021 | Ishikawa .............. G06K 9/6212 |
| 2006/0140449 A1 | 6/2006 | Otsuka et al. |

(Continued)

FOREIGN PATENT DOCUMENTS

| EP | 2 889 641 | 7/2015 |
| EP | 3 547 215 | 10/2019 |

(Continued)

OTHER PUBLICATIONS

Extended European Search Report dated Jan. 7, 2020 in corresponding European Patent Application No. 19188504.5.

(Continued)

*Primary Examiner* — Randolph I Chu
(74) *Attorney, Agent, or Firm* — Wenderoth, Lind & Ponack, L.L.P.

(57) ABSTRACT

An information processing method includes: acquiring a first object detection result obtained by use of an object detection model to which sensing data from a first sensor is input, and a second object detection result obtained by use of a second sensor; determining a degree of agreement between the first object detection result and the second object detection result in a specific region in a sensing space of the first sensor and the second sensor; and selecting the sensing data as learning data for the object detection model, according to the degree of agreement obtained in the determining.

15 Claims, 14 Drawing Sheets

(51) Int. Cl.
  *G06V 20/56* (2022.01)
  *G06V 20/58* (2022.01)
  *G06V 40/10* (2022.01)
(52) U.S. Cl.
  CPC .......... *G06V 20/588* (2022.01); *G06V 40/103* (2022.01); *G06T 2207/30196* (2013.01); *G06T 2207/30252* (2013.01)

(56) References Cited

U.S. PATENT DOCUMENTS

| | | | |
|---|---|---|---|
| 2012/0185167 | A1 | 7/2012 | Higuchi et al. |
| 2018/0106885 | A1 | 4/2018 | Blayvas |
| 2019/0073545 | A1 | 3/2019 | Dolgov et al. |
| 2019/0176839 | A1* | 6/2019 | Mukai .................. G05D 1/0257 |
| 2019/0202451 | A1* | 7/2019 | Hayamizu ............. B60W 30/09 |
| 2019/0294966 | A1* | 9/2019 | Khan .................... G06K 9/6267 |
| 2021/0150278 | A1* | 5/2021 | Dudzik ................. G01S 17/931 |
| 2021/0263157 | A1* | 8/2021 | Zhu ........................ G06N 3/08 |

FOREIGN PATENT DOCUMENTS

| | | |
|---|---|---|
| JP | 2006-182086 | 7/2006 |
| JP | 2011-28659 | 2/2011 |
| JP | 2012-123642 | 6/2012 |
| JP | 2015-143979 | 8/2015 |
| JP | 2017-102838 | 6/2017 |

OTHER PUBLICATIONS

Wei et al., "LiDAR and Camera Detection Fusion in a Real-Time Industrial Multi-Sensor Collision Avoidance System," Electronics, Jul. 2018.
Oh et al., "Object Detection and Classification by Decision-Level Fusion for Intelligent Vehicle Systems," Sensors, Jan. 2017.
Communication pursuant to Article 94(3) EPC dated Jun. 25, 2021 in corresponding European Patent Application No. 19188504.5.

* cited by examiner

FIG. 1
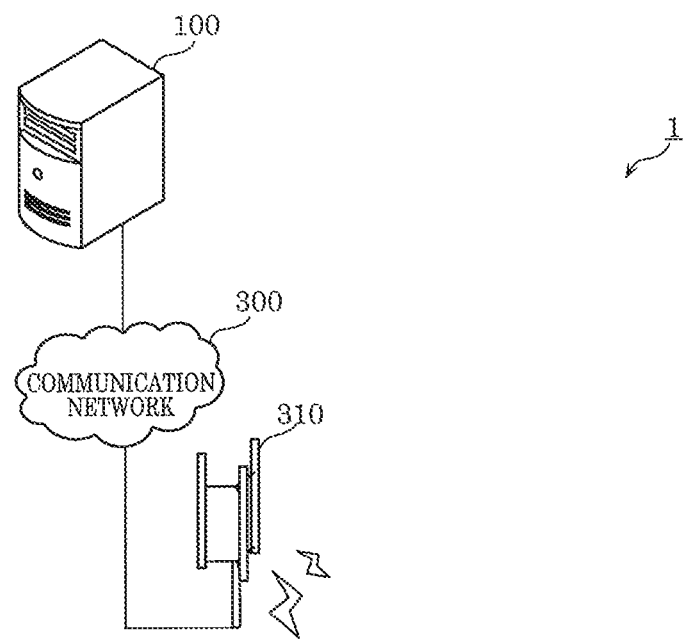
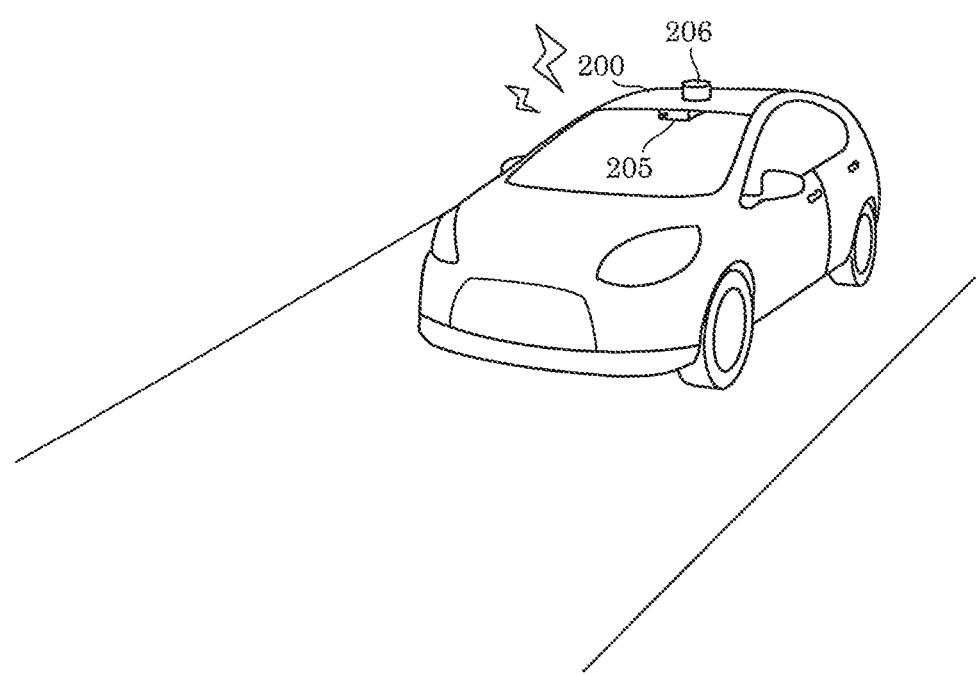

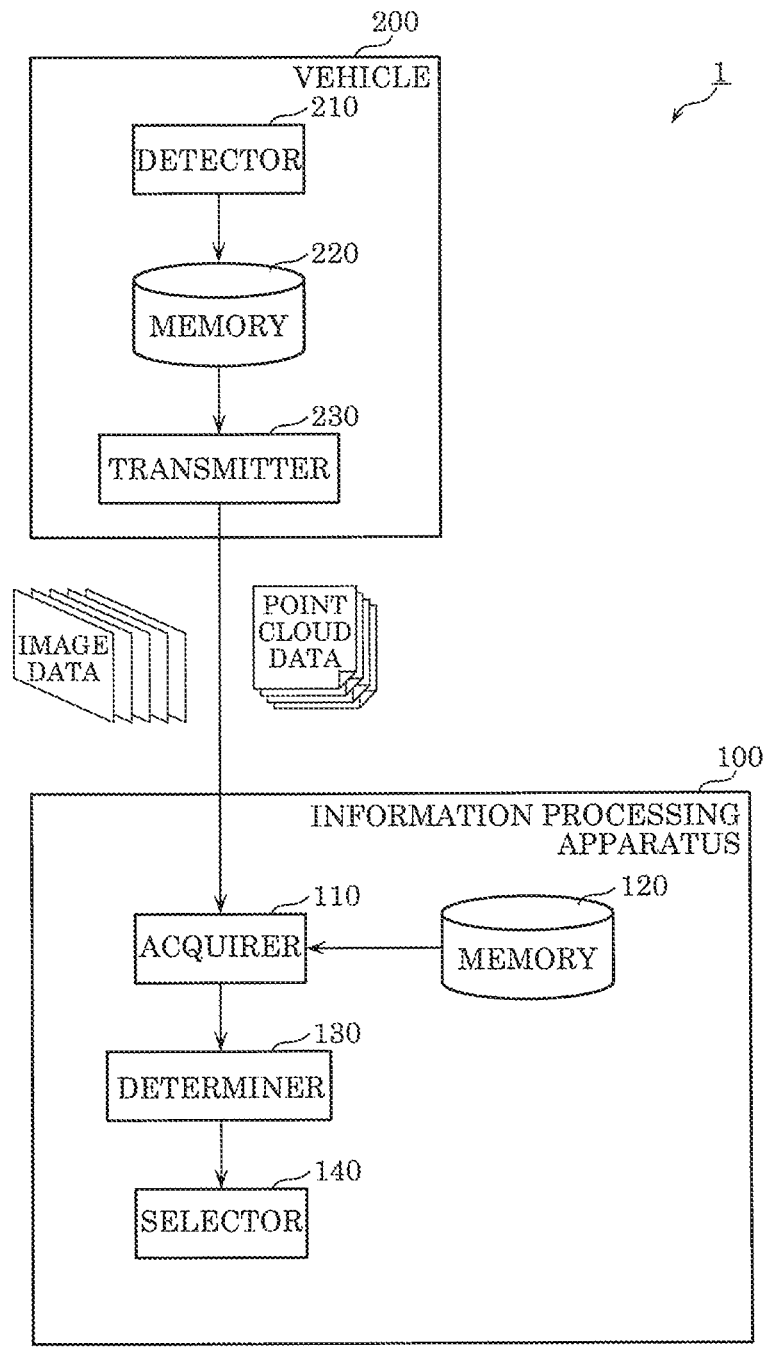

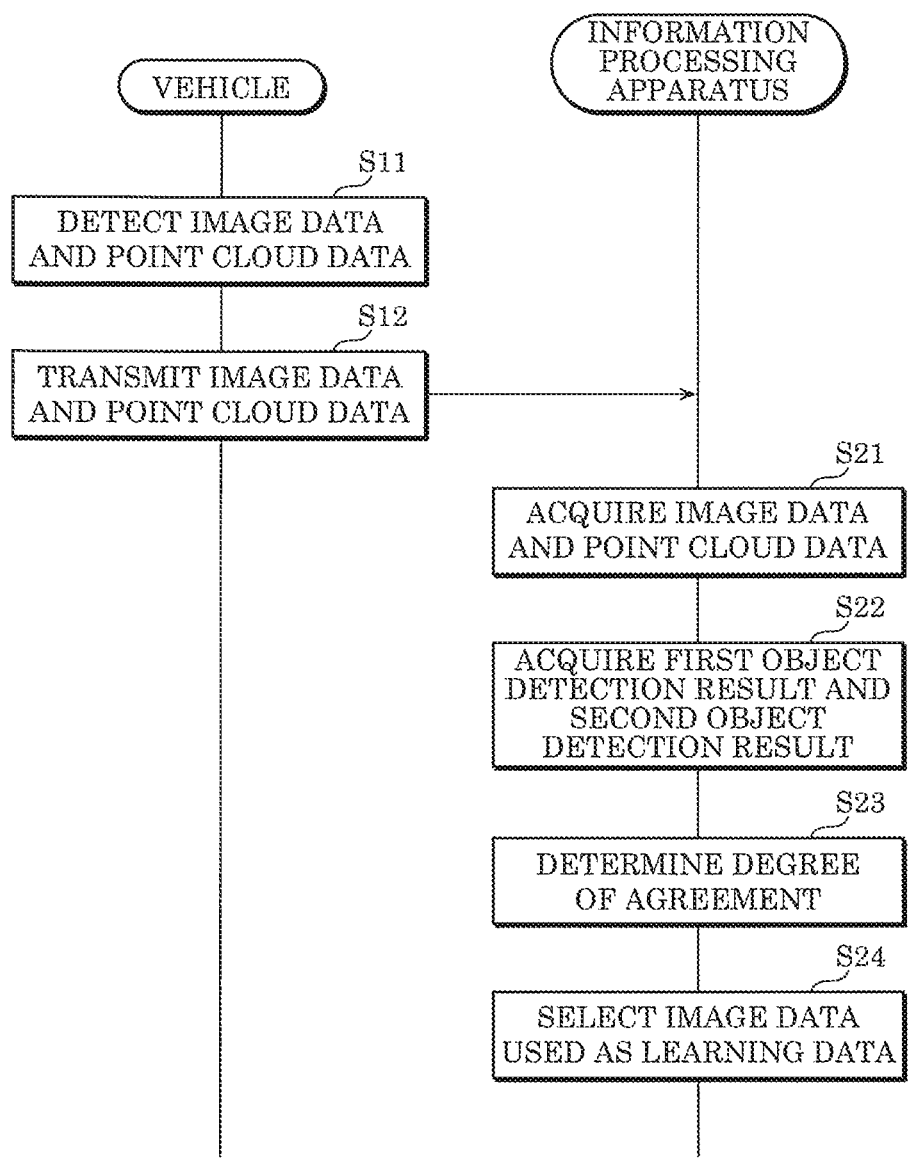

INFORMATION PROCESSING METHOD, INFORMATION PROCESSING APPARATUS, AND RECORDING MEDIUM FOR SELECTING SENSING DATA SERVING AS LEARNING DATA

CROSS REFERENCE TO RELATED APPLICATION

This application claims the benefit of priority of Japanese Patent Application Number 2018-145357 filed on Aug. 1, 2018, the entire content of which is hereby incorporated by reference.

BACKGROUND

1. Technical Field

The present disclosure relates to an information processing method, an information processing apparatus, and a recording medium for selecting sensing data serving as learning data.

2. Description of the Related Art

Japanese Unexamined Patent Application Publication No. 2017-102838 discloses a database construction system that automatically collects supervised learning data for machine learning that uses a result of detection by one of a plurality of kinds of sensors as training data to perform recognition of objects from outputs of another sensor.

SUMMARY

By the technique of Japanese Unexamined Patent Application Publication No. 2017-102838, however, in a case where a precision or an accuracy (hereinafter, also referred to simply as a precision) of a result of detection by a sensor to be used as training data is low, the result of detection by the sensor is not adopted as learning data. It is therefore difficult to obtain learning data using a sensor with a low precision.

Hence, the present disclosure has an object to provide an information processing method, an information processing apparatus, and a recording medium that are capable of obtaining learning data for detecting an intended object even when a result of detection by a sensor with a low precision is used.

An information processing method according to an aspect of the present disclosure includes: acquiring a first object detection result obtained by use of an object detection model to which sensing data from a first sensor is input, and a second object detection result obtained by use of a second sensor; determining a degree of agreement between the first object detection result and the second object detection result in a specific region in a sensing space of the first sensor and the second sensor; and selecting the sensing data as learning data for the object detection model, according to the degree of agreement obtained in the determining.

Note that these general or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

The information processing method, the information processing apparatus, and the recording medium according to the present disclosure can obtain learning data for detecting an intended object even when a result of detection by a sensor with a low precision is used.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 1 is a diagram illustrating an appearance of an information processing system according to Embodiment 1;

FIG. 4 is a block diagram illustrating an example of a functional configuration of the information processing system according to Embodiment 1;

FIG. 12 is a sequence diagram illustrating an example of operations performed in the information processing system;

Figure 2:
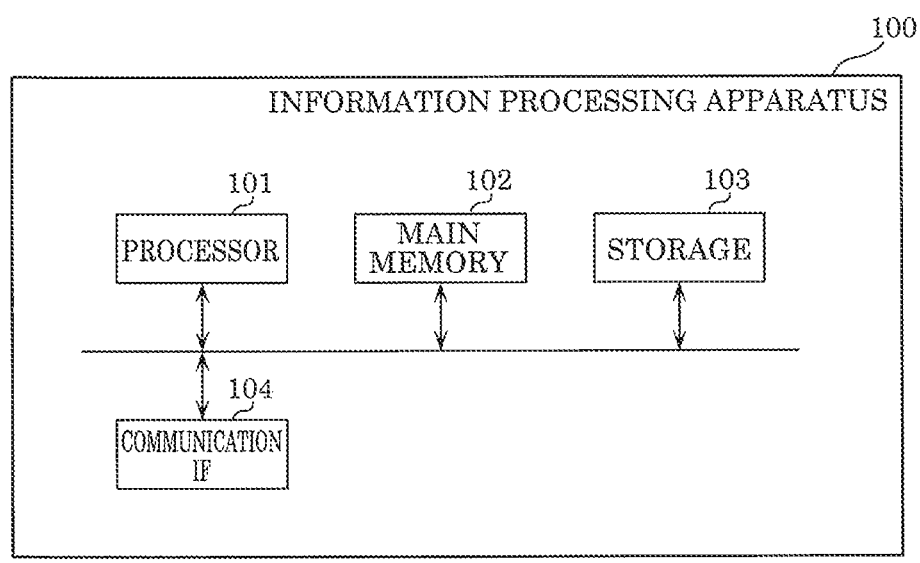
FIG. 2 is a block diagram illustrating an example of a hardware configuration of an image processing apparatus according to Embodiment 1.

DETAILED DESCRIPTION OF THE EMBODIMENTS (Underlying Knowledge Forming the Basis of the Present Disclosure)

The inventor found that the following problems arise in the database construction system described in the "BACKGROUND" section.

In recent years, object detection using machine learning such as deep learning on images taken by cameras has been put to practical use in fields such as automated driving, video surveillance, and robotics. Such object detection requires a large amount of training data used in machine learning. Hence, a large number of images taken by different cameras are collected, and a person gives correct solutions to the collected images to create the training data.

However, giving the correct solutions to the images by a person increases costs, and it is thus not preferable to create the training data simply from all of a large number of obtained images. In addition, even if the training data can be obtained by giving the correct solutions to all of the large number of images without regard to costs, the large amount of obtained training data needs to be subjected to machine learning, which increases a processing load on the machine learning and increases a processing time. To perform machine learning efficiently, it is therefore necessary to select images useful for the machine learning from among a large number of images.

Here, the large number of images used for the machine learning are required to include a plurality of images taken in varied situations different from one another, that is, a plurality of various images. In other words, using a plurality of images taken in situations different from one another is more effective in implementing efficient machine learning than using a plurality of images taken in situations similar to one another.

As described above, the database construction system of Japanese Unexamined Patent Application Publication No. 2017-102838 collects the supervised learning data by associating highly confident recognition data on objects based on output data from a first sensor with training data and input data being output data obtained by a second sensor.

However, in a case where the confidence of the recognition data on objects based on the output data from the first sensor is not high, there is a risk of creating incorrect training data. For example, since the confidence of the recognition data on objects depends on a quality of the first sensor, the first sensor is to be required to have a certain or higher quality. That is, in the conventional technique, using a detection result by a sensor with a low precision makes it difficult to obtain learning data for implementing efficient machine learning. The conventional technique discloses that the recognition data is not adopted as the training data in a case where a confidence of the recognition data is not high. However, this manner has a risk that the learning data cannot be obtained when a sensor with a low precision is used.

In order to solve such problems, an information processing method according to an aspect of the present disclosure includes: acquiring a first object detection result obtained by use of an object detection model to which sensing data from a first sensor is input, and a second object detection result obtained by use of a second sensor; determining a degree of agreement between the first object detection result and the second object detection result in a specific region in a sensing space of the first sensor and the second sensor; and selecting the sensing data as learning data for the object detection model, according to the degree of agreement obtained in the determining.

By selecting the learning data based on the degree of agreement between the first object detection result and the second object detection result in this manner, an effectiveness of the learning data becomes less susceptible to the respective precisions of the first sensor and the second sensor, particularly to the precision of the second sensor. On the other hand, if the determination is made using only the degree of agreement, a difference in properties of sensors or the like arises a risk that the learning data is selected due to objects not to be detected (in other words, not to be learned). In contrast, according to the present aspect, since the degree of agreement between the first object detection result and the second object detection result is determined in the specific region in the sensing space of the first sensor and the second sensor, and thus, for example, a degree of agreement between a first object detection result and a second object detection result in a region having a high probability that the objects to be detected in the object detection are present can be determined. This can prevent learning data from being selected due to objects not to be detected. As a result, learning data for detecting an intended object can be obtained even when a result of detection by a sensor with a low precision is used.

Furthermore, the information processing method may further include selecting the second object detection result as correct data for learning the object detection model, according to the degree of agreement.

This enables the information processing method to automatically gives the second object detection result as the correct data to the image data in a case where the degree of agreement between the first object detection result and the second object detection result is equal to or higher than the predetermined value.

Furthermore, the specific region may further be a region that is in accordance with an object to be detected in the object detection model.

For this reason, the first object detection results and the second object detection results to be subjected to the determination of the degree of agreement can be narrowed reliably by using first object detection results and second object detection results included in a region that is in accordance with objects to be detected in the object detection model. This can prevent learning data from being selected due to objects not to be detected, more reliably.

Furthermore, the object to be detected may be a vehicle, and the region that is in accordance with the object to be detected may be a region corresponding to a road in the sensing space.

For this reason, the first object detection results and the second object detection results to be subjected to the determination of the degree of agreement can be narrowed to first object detection results and second object detection results included in a region that is in accordance with the vehicle to be detected, that is, the region where the road is present. This can prevent learning data from being selected due to objects other than vehicles, more reliably.

Furthermore, the object to be detected may be a person, and the region that is in accordance with the object to be detected may be a region corresponding to a sidewalk in the sensing space.

For this reason, the first object detection results and the second object detection results to be subjected to the determination of the degree of agreement can be narrowed to first object detection results and second object detection results included in a region that is in accordance with the person to be detected, that is, the region where the sidewalk is present. This can prevent learning data from being selected due to objects other than persons, more reliably.

Furthermore, the first sensor and the second sensor may be held in a moving body, and the information processing method may further include: acquiring map information and position information indicating a position of the moving body; and determining, as the specific region, a region determined to be either a road or a sidewalk from the map information and the position information.

Accordingly, since the region determined to be a road or a sidewalk is specified from the map information and the position information indicating the position of the moving body, a region having a high possibility that a vehicle or a person to be detected is included in the region can be specified more reliably.

Furthermore, the first sensor and the second sensor may be held in a moving body, and the information processing method may further include: acquiring an image; and determining, as the specific region, a region determined to be either a road or a sidewalk, using image recognition on the acquired image.

Accordingly, since the region determined to be a road or a sidewalk is specified by performing image recognition on the image, a region having a high possibility that a vehicle or a person to be detected is included in the region can be specified based on an actual situation.

Furthermore, in the selecting of the sensing data as the learning data, in a case where the first object detection result does not agree with the second object detection result or in a case where the degree of agreement is low, the sensing data may be selected as the learning data for the object detection model.

Accordingly, the sensing data that the object detection model is highly likely to fail to learn can be selected as the learning data.

Note that these general or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

Hereinafter, an information processing method, an information processing apparatus, and a recording medium will be described in detail with reference to the drawings.

Note that each of the following embodiments shows a specific example of the present disclosure. The numerical values, shapes, materials, structural components, the arrangement and connection of the structural components, steps, the processing order of the steps, etc. shown in the following embodiments are mere examples, and thus are not intended to limit the present disclosure. Furthermore, among the structural components described in the following embodiments, structural components not recited in any one of the independent claims that indicate the broadest concepts are described as optional structural components.

Embodiment 1

Embodiment 1 will be described below with reference to FIG. 1 to FIG. 9.

[1-1. Configuration]

FIG. 1 is a diagram illustrating an appearance of an information processing system according to Embodiment 1.

Specifically, FIG. 1 illustrates information processing apparatus 100, vehicle 200, communication network 300, and base station 310 of a mobile telecommunications system. Of these constituent components, for example, information processing system 1 includes information processing apparatus 100 and vehicle 200. Note that although FIG. 1 illustrates one vehicle 200, the number of vehicles 200 may be two or more and may be any number more than one.

Information processing apparatus 100 is an apparatus that acquires a plurality of images taken by camera 205 included in vehicle 200 and selects learning data for machine learning from among the plurality of acquired images. Information processing apparatus 100 is, for example, a server.

Vehicle 200 is a vehicle that includes camera 205 and light detection and ranging (LIDAR) 206 and performs automated driving or driver assistance using a result of object detection or object recognition obtained by use of image data obtained by camera 205 and LIDAR 206. Note that vehicle 200 does not necessarily need to have a function of the automated driving or the driver assistance as long as it includes camera 205 and LIDAR 206. Vehicle 200 is an example of a moving body and may be a moving body other than vehicle 200.

Communication network 300 may be a general-purpose network such as the Internet or may be a dedicated network. Base station 310 is, for example, a base station used in a mobile telecommunications system such as the third generation (3G) mobile telecommunications system, the fourth generation (4G) mobile telecommunications system, or LTE®.

Next, a specific example of a hardware configuration of information processing apparatus 100 will be described with reference to FIG. 2.

FIG. 2 is a block diagram illustrating an example of a hardware configuration of the image processing apparatus according to Embodiment 1.

As illustrated in FIG. 2, information processing apparatus 100 has a hardware configuration including processor 101, main memory 102, storage 103, and communication interface (IF) 104.

Processor 101 is a processor that executes a control program stored in storage 103 or the like.

Main memory 102 is a volatile storage area used by processor 101 executing the control program as a work area.

Storage 103 is a nonvolatile storage area for holding the control program or various kinds of data such as image data and point cloud data.

Communication IF 104 is a communication interface for communication with vehicle 200 over a communication network. Communication IF 104 is, for example, a wired LAN interface. Note that communication IF 104 may be a wireless LAN interface. Communication IF 104 is not limited to a LAN interface and may be any kind of communication interface that can establish a communication connection to the communication network.

Next, a specific example of a hardware configuration of vehicle 200 will be described with reference to FIG. 3.

Figure 3:
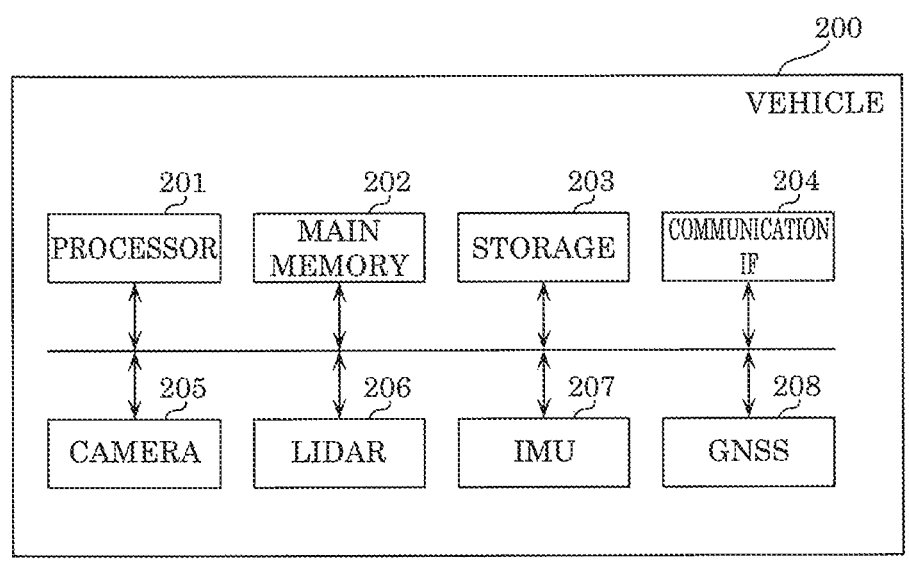
FIG. 3 is a block diagram illustrating an example of a hardware configuration of a vehicle according to Embodiment 1.

FIG. 3 is a block diagram illustrating an example of a hardware configuration of a vehicle according to Embodiment 1.

As illustrated in FIG. 3, vehicle 200 has a hardware configuration including processor 201, main memory 202, storage 203, communication interface (IF) 204, camera 205, LIDAR 206, inertial measurement unit (IMU) 207, and global navigation satellite system (GNSS) 208.

Processor 201 is a processor that executes a control program stored in storage 203 or the like. Processor 201 may include a processor used in an ECU for performing automated driving or driver assistance in vehicle 200.

Main memory 202 is a volatile storage area used by processor 201 executing the control program as a work area.

Storage 203 is a nonvolatile storage area for holding the control program or various kinds of data such as image data and point cloud data.

Communication IF 204 is a communication interface for communication with information processing apparatus 100 over communication network 300. That is, communication IF 204 may be any communication interface that can establish a communication connection to communication network 300. Specifically, communication IF 204 is a communication interface for establishing a communication connection to communication network 300 through a communication connection to base station 310 of the mobile telecommunications system. Communication IF 204 may be, for example, a wireless communication interface conforming to a telecommunications standard used in a mobile telecommunications system such as the third generation (3G) mobile telecommunications system, the fourth generation (4G) mobile telecommunications system, or LTE®. Furthermore, communication IF 204 may be, for example, a wireless local area network (LAN) interface conforming to IEEE 802.11a, b, g, n, or ac standard or may be an communication interface that establishes a communication connection to communication network 300 through a communication connection to a router (e.g., a mobile wireless LAN router) not illustrated.

Camera 205 is an optical sensor held in vehicle 200, including an optical system such as lenses, and including an image sensor, and is an example of the first sensor.

LIDAR 206 is a laser sensor that is held in vehicle 200 and detects distances to objects located within a detection range spreading omnidirectionally 360 degrees in a horizontal direction of vehicle 200 by a predetermined angle (e.g., 30 degrees) in a vertical direction of vehicle 200. LIDAR 206 is a distance sensor and an example of the second sensor. LIDAR 206 emits laser beams to an environment and detects laser beams reflected from objects in the environment, so as to measure distances from LIDAR 206 to the objects. LIDAR 206 measures the distance on the order of, for example, centimeters. In this manner, LIDAR 206 detects three-dimensional coordinates of each of a plurality of points on a terrain surface in the environment of vehicle 200. That is, LIDAR 206 detects pluralities of three-dimensional coordinates of the terrain surface in the environment to detect three-dimensional shape of the terrain including objects in the environment of vehicle 200. In this manner, LIDAR 206 provides point cloud data indicating three-dimensional shapes of the terrain including the objects in the environment of vehicle 200, and the point cloud data is made up of three-dimensional coordinates of a plurality of points. Note that the second sensor is not limited to the LIDAR and may be a distance sensor such as a millimeter-wave radar, an ultrasonic sensor, a time-of-flight (ToF) camera, and a stereo camera.

IMU 207 is a sensor device including an acceleration sensor and a gyro sensor. The acceleration sensor is a sensor that detects accelerations that vehicle 200 undergoes in three different directions, respectively. The gyro sensor is a sensor that detects angular velocities of respective rotations of vehicle 200 about three axes in three different directions.

GNSS 208 receives information indicating a position of GNSS 208 itself from artificial satellites including global positioning system (GPS) satellites. That is, GNSS 208 detects a current position of vehicle 200.

Next, a functional configuration of information processing system 1 will be described with reference to FIG. 4.

FIG. 4 is a block diagram illustrating an example of a functional configuration of the information processing system according to Embodiment 1. Note that FIG. 4 does not illustrate communication network 300 and base station 310 illustrated in FIG. 1.

A functional configuration of vehicle 200 will be described first.

Vehicle 200 has a functional configuration including detector 210, memory 220, and transmitter 230.

Detector 210 detects image data that is sensing data obtained through sensing by camera 205 as the first sensor of vehicle 200 and detects point cloud data that is sensing data obtained through sensing by LIDAR 206 as the second sensor of vehicle 200.

Detector 210 detects a plurality of image data items taken by camera 205 at a plurality of different time points. The plurality of image data items are, for example, items of data indicating a video or a plurality of still images obtained by performing capturing by camera 205. Detector 210 detects a plurality of point cloud data items detected by LIDAR 206 at a plurality of different time points. In the point cloud data obtained by LIDAR 206, the three-dimensional coordinates representing each of the plurality of points may be associated with the time, the time may be associated with each point cloud that is obtained in specified units of, for example, one or more sweeps of a laser beam of LIDAR 206, or each point cloud acquired during each of separated time units may be associated with the time.

Detector 210 stores the plurality of image data items in memory 220 after associating a plurality of frames or a plurality of still images forming the plurality of image data items with capturing time points, which are the time at which the frames or the still images are taken. In addition, detector 210 associates the plurality of point cloud data items with detection time points, each of which is the time at which the relevant point cloud data item is detected, and stores the point cloud data items and the detection time points in memory 220. To associate the plurality of image data items and the plurality of point cloud data items according to detection time points, one of an image data item and a point cloud data item may be associated with the other that is obtained at a time point closest to a time point at which the one is obtained, or a plurality of image data items and a plurality of point cloud data items detected at predetermined time intervals may be associated with each other.

Detector 210 is provided by, for example, camera 205, LIDAR 206, and the like.

Memory 220 stores the plurality of image data items detected by detector 210 together with the respective capturing time points of the plurality of image data items. Memory 220 also stores the plurality of point cloud data items detected by detector 210 together with the respective detection time points of the plurality of point cloud data items. Memory 220 is provided by, for example, storage 203.

Transmitter 230 transmits the plurality of image data items and the plurality of point cloud data items stored in memory 220 to information processing apparatus 100. Transmitter 230 may transmit the plurality of image data items and the plurality of point cloud data items detected by detector 210 to information processing apparatus 100 periodically, for example, every day or every week. In addition, for example, when vehicle 200 is parked in a storage space for vehicle 200 such as a home of a driver of vehicle 200, transmitter 230 may transmit the plurality of image data items and the plurality of point cloud data items obtained during traveling until the parking to the information processing apparatus. At this time, in a case where there are a plurality of image data items and a plurality of point cloud data items not transmitted to information processing apparatus 100 yet, transmitter 230 may transmit the plurality of image data items and the plurality of point cloud data items to information processing apparatus 100.

Transmitter 230 is provided by, for example, processor 201, main memory 202, storage 203, communication IF 204, and the like.

Next, a functional configuration of information processing apparatus 100 will be described.

Information processing apparatus 100 has a functional configuration including acquirer 110, memory 120, determiner 130, and selector 140.

Acquirer 110 acquires a plurality of image data items and a plurality of point cloud data items from vehicle 200.

Acquirer 110 performs a detection process using an object detection model stored in memory 120 on the plurality of image data items, so as to acquire first object detection results. Acquirer 110 also performs a predetermined process on each of the plurality of point cloud data items and acquires a result of the predetermined process as second object detection results obtained by use of the second sensor. By performing the predetermined process, for example, acquirer 110 removes point clouds of the detected ground from the plurality of point cloud data items, divides resultant point clouds for each of one or more objects, and acquires resultant point cloud data items as the second object detection results. Note that the second object detection results may be made up of three-dimensional regions covered by the point cloud data items divided for each of the one or more objects, or may be made up of two-dimensional regions obtained by projecting the point cloud data items divided for each of the one or more objects onto an image represented by an image data item. The second object detection results are not limited to ones obtained by performing the predetermined process on point cloud data and may be the point cloud data itself.

Here, a specific example of a process by acquirer 110 for acquiring the first object detection results and the second object detection results will be described with reference to FIG. 5A to FIG. 5C.

Figure 5A:
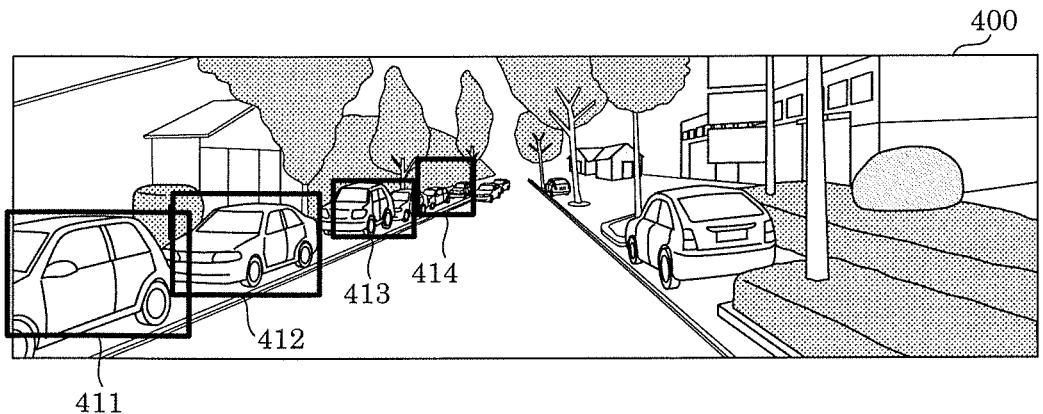
FIG. 5A is a diagram illustrating an example of first object detection results.
Figure 5B:
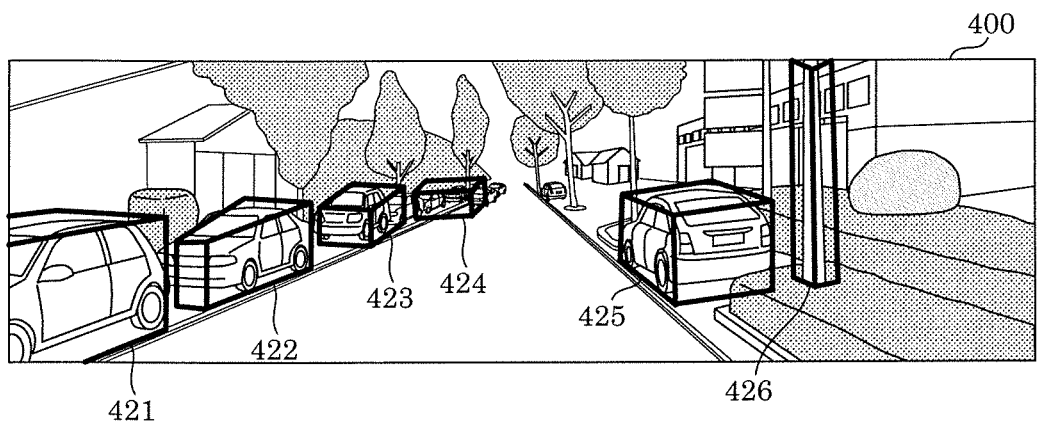
FIG. 5B is a diagram illustrating an example of second object detection results.
Figure 5C:
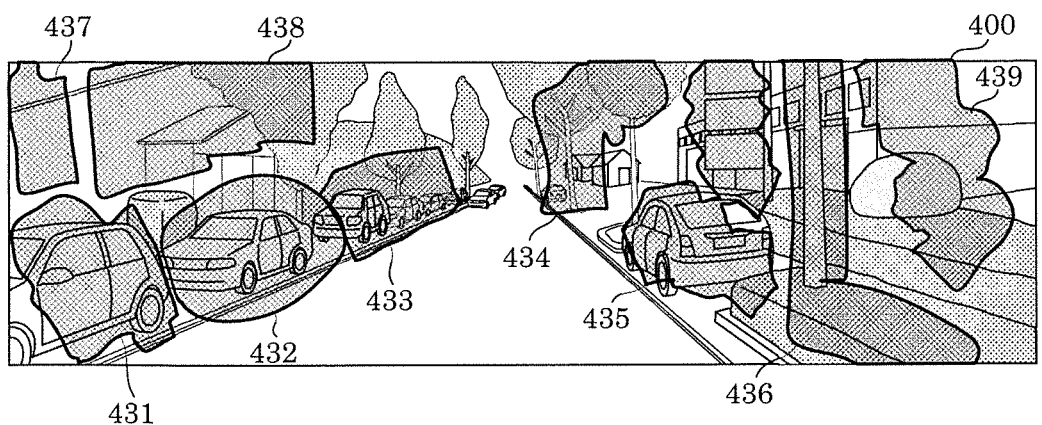
FIG. 5C is a diagram illustrating another example of the second object detection results.

FIG. 5A to FIG. 5C are diagrams illustrating an example of first object detection results and second object detection results. FIG. 5A is a diagram illustrating an example of first object detection results in image 400 represented by an image data item. FIG. 5B is a diagram illustrating an example of second object detection results in image 400 represented by the image data item. FIG. 5C is a diagram illustrating another example of the second object detection results in image 400 represented by the image data item. For convenience of description, FIG. 5B and FIG. 5C illustrate the second object detection results as diagrams in which point cloud data items, which are the second object detection results, are projected onto image 400. However, the second object detection results are actually the point cloud data items not projected onto image 400. FIG. 5B illustrates an example of results of detection by a sensor with a high precision, and FIG. 5C illustrates an example of results of detection by a sensor with a precision lower than that of the sensor with which the second object detection results illustrated in FIG. 5B is obtained. Note that disposing either one of the sensor with which the second object detection results illustrated in FIG. 5B are obtained and the sensor with which the second object detection results illustrated in FIG. 5C are obtained in vehicle 200 as the second sensor will suffice. A reason for referencing to FIG. 5B and FIG. 5C is to compare a case of using the second object detection results by the sensor with a high precision and a case of using the second object detection results by the sensor with a low precision.

As illustrated in FIG. 5A, acquirer 110 performs the detection process using the object detection model on image 400 to detect objects in image 400 and acquires information on frames and the like indicating regions where the objects in image 400 are located as a plurality of first object detection results 411 to 414. In addition, as illustrated in FIG. 5B, acquirer 110 performs the predetermined process on point cloud data acquired by the sensor with a high precision to acquire a plurality of second object detection results 421 to 426. In addition, as illustrated in FIG. 5C, acquirer 110 performs the predetermined process on point cloud data acquired by the sensor with a low precision to acquire a plurality of second object detection results 431 to 439.

Note that acquirer 110 is provided by, for example, processor 101, main memory 102, storage 103, communication IF 104, and the like.

Memory 120 stores the object detection model used in the detection process of detecting objects. The object detection model may be an object detection model that need not be used only in the detection process but is used in a recognition process of recognizing what kind of object an object is. Memory 120 is provided by, for example, storage 103.

Determiner 130 performs a determination process of determining a degree of agreement between first object detection results and second object detection results in a region in a sensing space of camera 205 and LIDAR 206. For example, as illustrated in FIG. 6, determiner 130 first specifies, in the above-described sensing space, region R3 where capturing range R1 within which camera 205 can perform capturing overlaps detection range R2 within which LIDAR 206 can perform detection, as a specific region used in the determination process.

Figure 6:
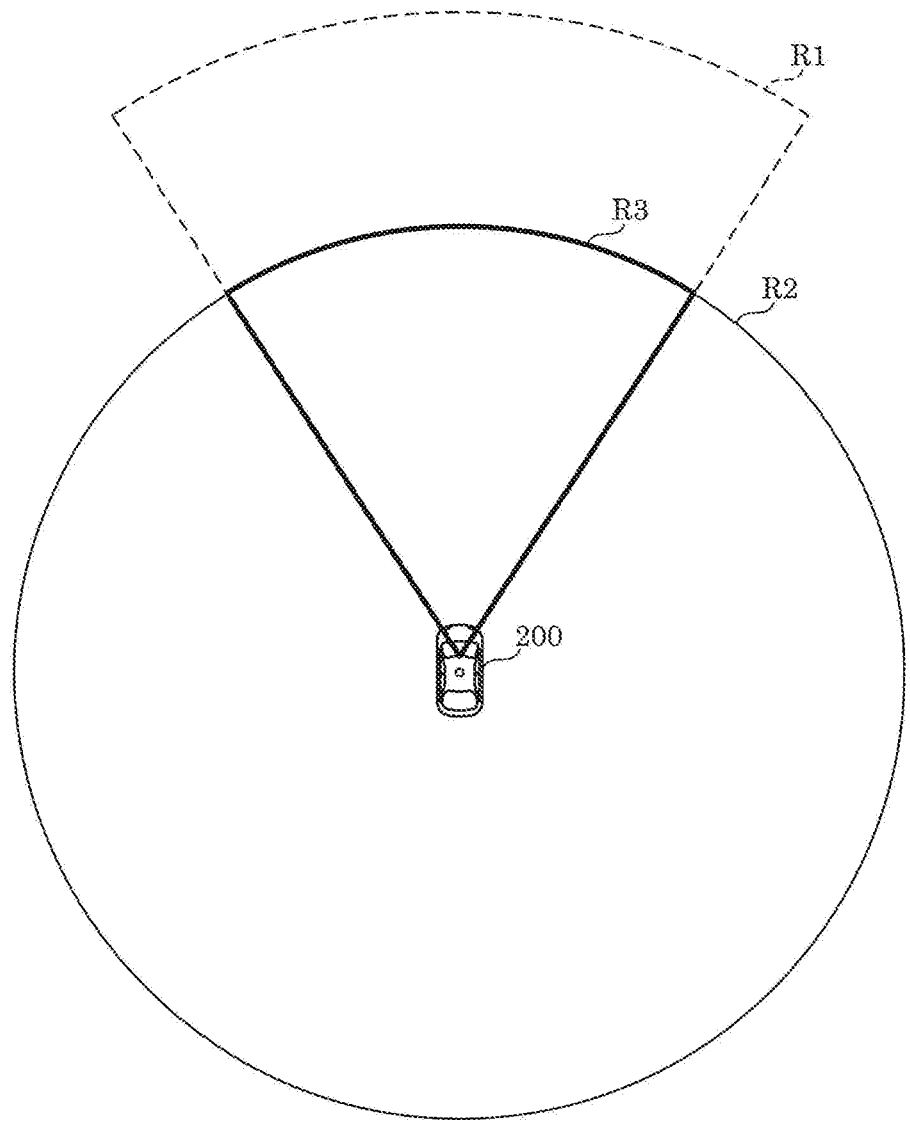
FIG. 6 is a diagram illustrating a region where a capturing range of a camera overlaps a detection range of a LIDAR.

Note that FIG. 6 is a diagram illustrating the region where the capturing range of the camera overlaps the detection range of the LIDAR.

In the overlapped region, determiner 130 can specify the region that is in accordance with the objects to be detected in the object detection model stored in memory 120, as a specific region used in the determination process. The specific region used in the determination process is, for example, a two-dimensional region in an image represented by image data acquired from vehicle 200.

The objects to be detected are, for example, vehicles. That is, the objects to be detected are vehicles around vehicle 200. In this case, the region that is in accordance with the objects to be detected is a region where a road is present in the sensing space.

Figure 7:
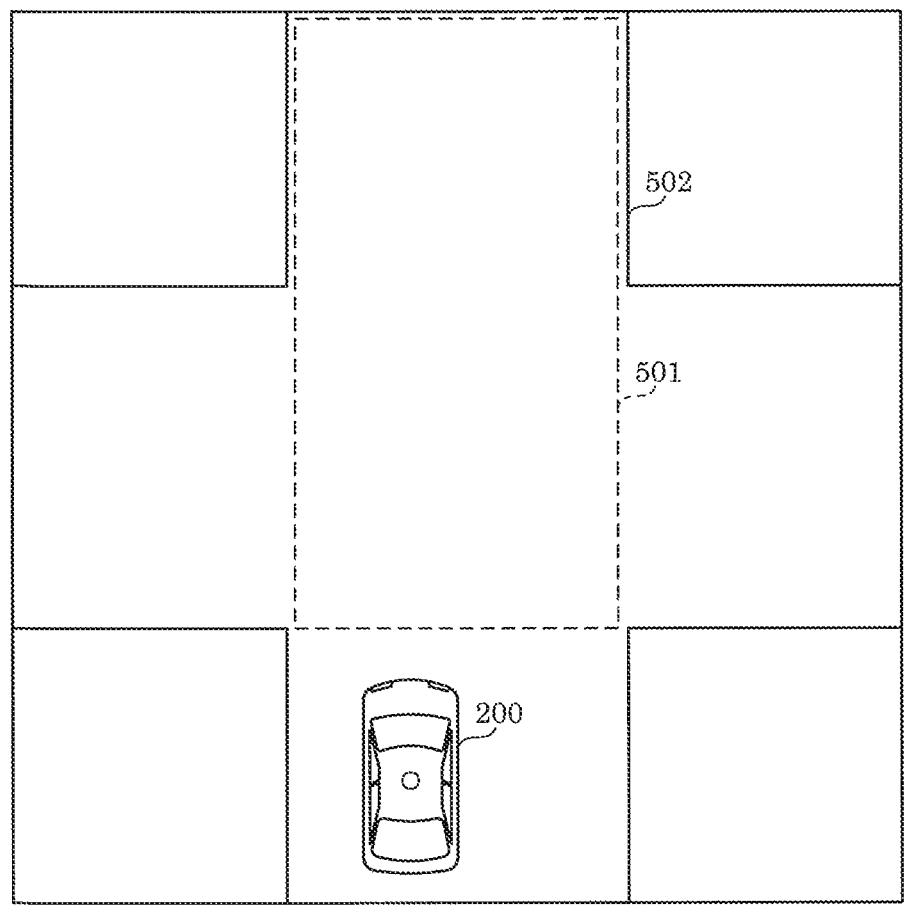
FIG. 7 is a schematic diagram used for describing a specific example of a process in which a determiner determines a region where a road is present.

FIG. 7 is a schematic diagram used for describing a specific example of a process in which the determiner determines a region where a road is present. FIG. 7 is a diagram illustrating an example of a case where the road is a crossing, where the vehicle and the road are viewed from above.

As illustrated in FIG. 7, in a case where the region that is in accordance with the objects to be detected is regarded as the region where the road is present, determiner 130 can determine region 501 extending in a forward direction of vehicle 200 to a certain extent from a position at which vehicle 200 is present to be the region where the road is present. Note that the forward direction of vehicle 200 means here, for example, a forward direction of a travel direction of vehicle 200.

In this case, determiner 130 may acquire map information and position information indicating the position of vehicle 200 and may determine region 502 where the road is present, based on a position of the road indicated by the acquired map information and the position of vehicle 200 indicated by the position information. Memory 120 of information processing apparatus 100 stores the map information, and acquirer 110 acquires the map information from memory 120 and acquires, from vehicle 200, the position information indicating the position of vehicle 200 detected by GNSS 208 of vehicle 200. Alternatively, acquirer 110 may acquire the map information from an external information processing apparatus.

Note that since FIG. 7 illustrates the example where the road is a crossing, a shape of region 502 where the road is present specified by the map information and the position information is a cross shape. However, in a case where the road is not a crossing, region 502 has a linear shape extending in a front-to-back direction.

Figure 8:
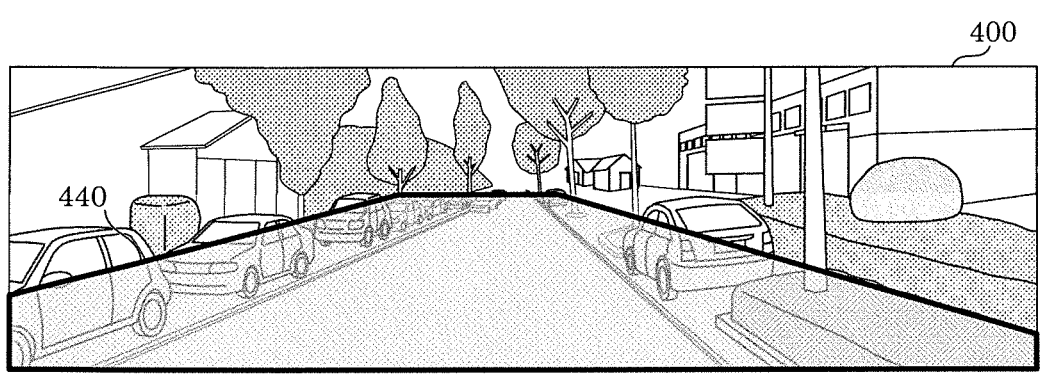
FIG. 8 is a schematic diagram of a region where a road is present projected onto an image represented by image data.

FIG. 8 is a schematic diagram of a region where a road is present projected onto an image represented by image data.

As illustrated in FIG. 8, determiner 130 may specify region 440 where the road is present in image 400 by projecting region 501 extending in the forward direction to a certain extent, which is specified as the region where the road is present, onto image 400 represented by the image data.

Alternatively, determiner 130 may determine the region where the road is present, by use of image recognition on image data acquired by acquirer 110. Determiner 130 may thereby specify region 440 where the road is present in image 400, as illustrated in FIG. 8.

Determiner 130 may determine the region where the road is present, by combining two or more of the above-described three methods.

The objects to be detected are, for example, persons. In this case, the region that is in accordance with the objects to be detected is a region where sidewalks are present in the sensing space.

Figure 9:
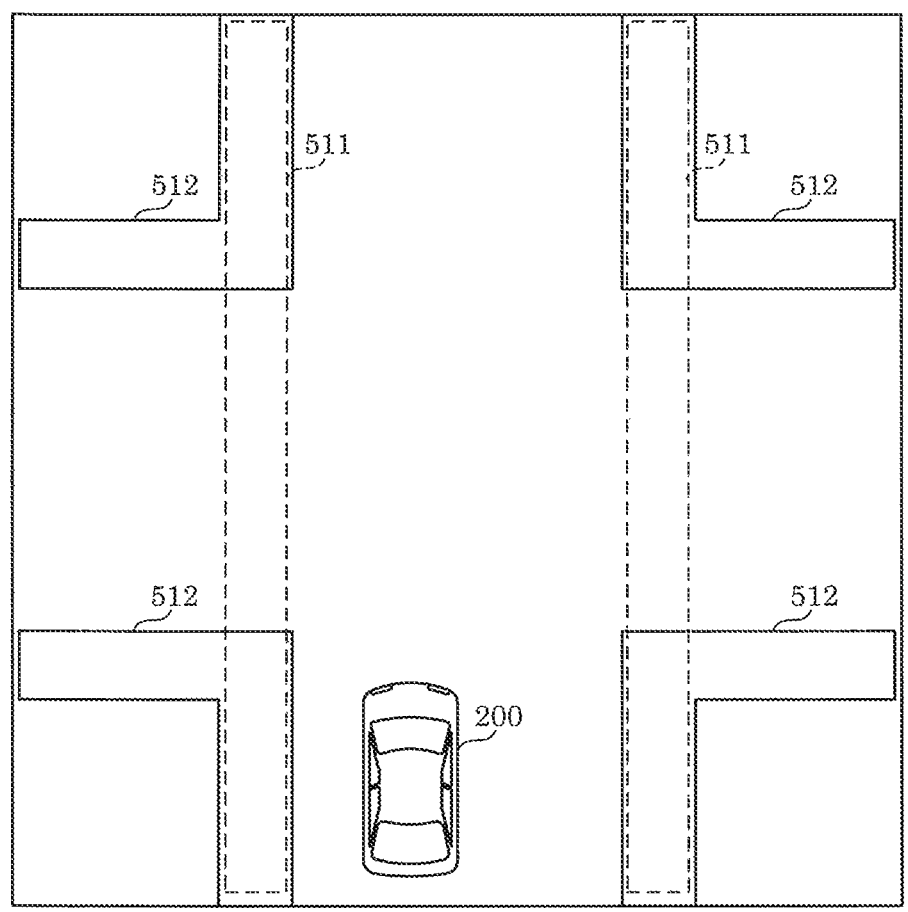
FIG. 9 is a schematic diagram used for describing a specific example of a process in which the determiner determines a region where sidewalks are present.

FIG. 9 is a schematic diagram used for describing a specific example of a process in which the determiner determines the region where the sidewalks are present. FIG. 9 is a diagram illustrating an example of a case where a road is a crossing, where the vehicle and the sidewalks are viewed from above.

As illustrated in FIG. 9, in a case where the region that is in accordance with the objects to be detected is regarded as the region where the sidewalks are present, determiner 130 can determine two regions 511 extending on both lateral sides of vehicle 200 in the forward direction to a certain extent from a position at which vehicle 200 is present to be the region where the sidewalks are present. Note that the lateral sides of vehicle 200 mean here, for example, both lateral sides lying in a lateral direction with respect to the travel direction of vehicle 200. In this case, determiner 130 may acquire map information and position information indicating the position of vehicle 200 and may determine regions 512 where the sidewalks are present, based on positions of the sidewalks indicated by the acquired map information and the position of vehicle 200 indicated by the position information. Note that memory 120 of information processing apparatus 100 stores the map information, and acquirer 110 acquires the map information from memory 120 and acquires, from vehicle 200, the position information indicating the position of vehicle 200 detected by GNSS 208 of vehicle 200. Alternatively, acquirer 110 may acquire the map information from an external information processing apparatus.

Note that since FIG. 9 illustrates the example where the road is a crossing, shapes of regions 512 where the sidewalks are present specified by the map information and the position information are four L-shapes. However, in a case where the road is not a crossing, regions 512 have linear shapes extending in the front-to-back direction as with two certain regions 511.

Figure 10:
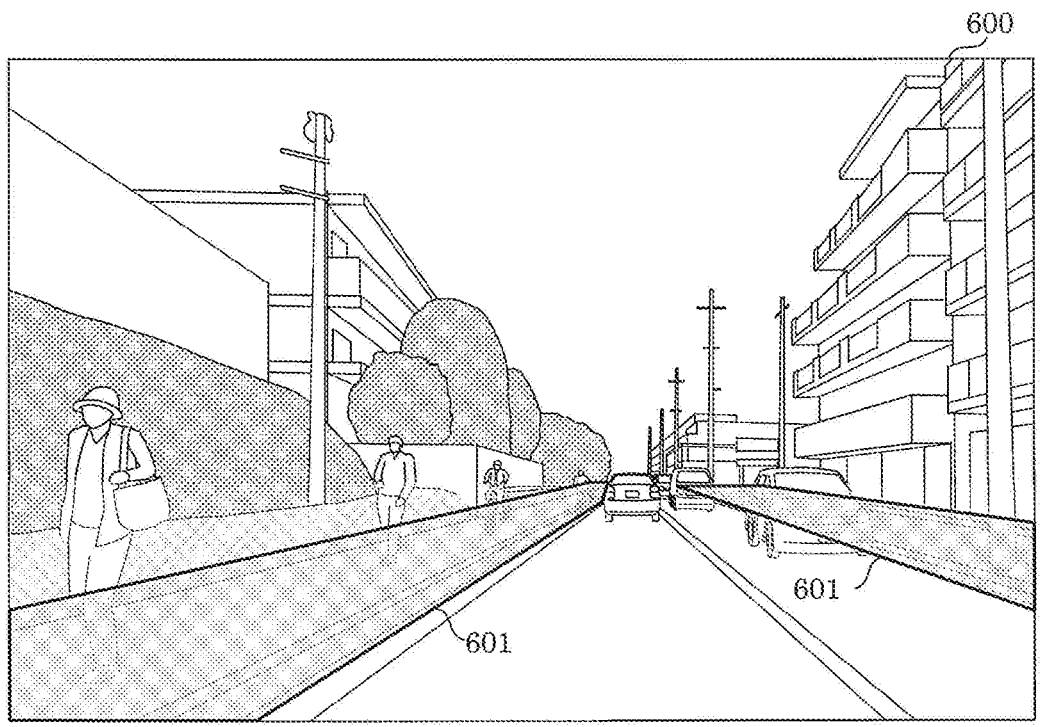
FIG. 10 is a schematic diagram of regions where sidewalks are present projected onto an image represented by image data.

FIG. 10 is a schematic diagram of the regions where the sidewalks are present projected onto an image represented by image data. Note that in FIG. 10, image 600 represented by the image data is an image different from image 400 represented by the image data in FIG. 5A to FIG. 5C.

As illustrated in FIG. 10, determiner 130 may specify regions 601 where the sidewalks are present in image 600 by projecting specified two certain regions 511, where the sidewalks are present, onto image 600 represented by the image data.

Alternatively, determiner 130 may determine the regions where the sidewalks are present, by use of image recognition on image data acquired by acquirer 110. Determiner 130 may thereby specify regions 601 where the sidewalks are present in image 600, as illustrated in FIG. 10.

Determiner 130 may determine the regions where the sidewalks are present, by combining two or more of the above-described three methods.

Note that although the region that is in accordance with the objects to be detected is regarded as a region where a road is present or regions where the sidewalks are present in the sensing space, the region that is in accordance with the objects to be detected may be a region where a road or a sidewalk is present in the sensing space.

After specifying the specific region used in the determination process, determiner 130 determines a degree of agreement between first object detection results and second object detection results in the specified region. Specifically, for each of the plurality of acquired image data items, in the specified region in an image represented by the image data item, determiner 130 projects a point cloud data item detected at a time point when the image data item is taken, onto corresponding two-dimensional coordinates in the image. Determiner 130 then compares second object detection results being pluralities of two-dimensional coordinates onto which the point cloud data item is projected in the image, with first object detection results being obtained by performing the detection process on the image and being regions where objects are detected in the image, and determines a degree of overlap to which the first object detection results overlap the second object detection results (i.e., an overlap ratio) as the degree of agreement.

Figure 11A:
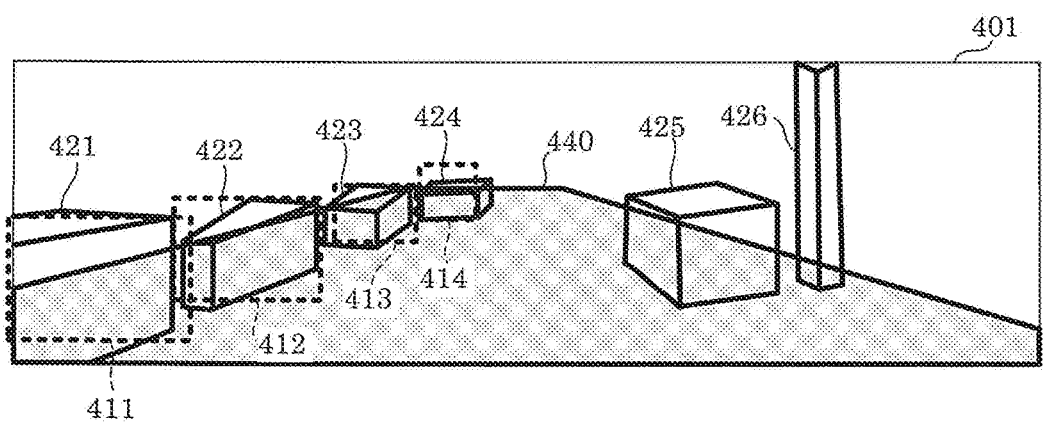
FIG. 11A is a diagram used for describing a process of determining a degree of agreement between first object detection results and second object detection results.
Figure 11B:
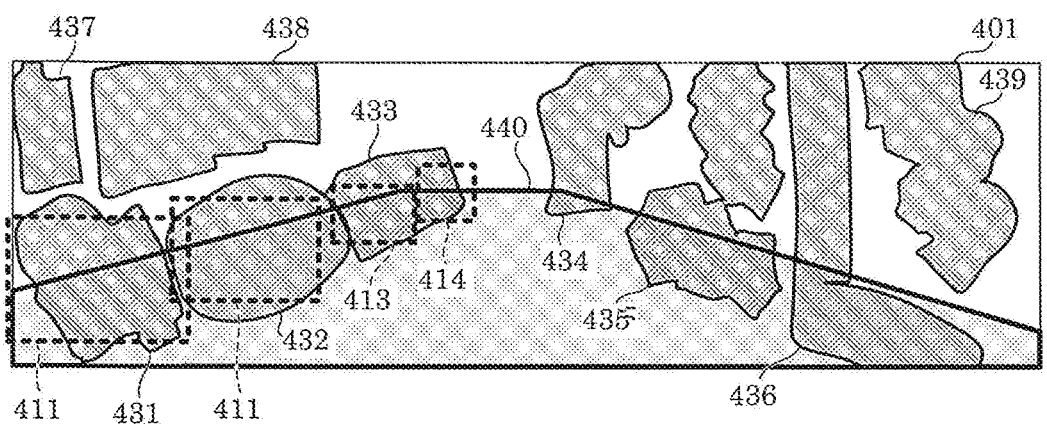
FIG. 11B is a diagram used for describing a process of determining a degree of agreement between first object detection results and second object detection results.

FIG. 11A and FIG. 11B are diagrams used for describing a process of determining a degree of agreement between first object detection results and second object detection results. FIG. 11A is a diagram obtained by superimposing the first object detection results illustrated in FIG. 5A on the second object detection results illustrated in FIG. 5B in region 401 in image 400. FIG. 11B is a diagram obtained by superimposing the first object detection results illustrated in FIG. 5A on the second object detection results illustrated in FIG. 5C in region 401 in image 400. Note that region 401 in image 400 is a region that covers entire image 400.

As illustrated in FIG. 11A, it is understood that the plurality of first object detection results 411 to 414 and the plurality of second object detection results 421 to 424 overlap each other in region 440 in image 400. Determiner 130 determines that the first object detection results and the second object detection results overlap each other in a case where, for example, the second object detection results overlap the first object detection results by a ratio much higher than a predetermined ratio (e.g., 50%). On the other hand, it is also understood that there are a plurality of second object detection results 425 and 426 that do not overlap the plurality of first object detection results in region 440 in image 400. In a case of FIG. 11A, it is therefore understood that the second object detection results include two objects that are not detected in the first object detection results.

In addition, as illustrated in FIG. 11B, it is understood that the plurality of first object detection results 411 to 414 and the plurality of second object detection results 431 to 433 overlap each other in region 440 in image 400. On the other hand, it is also understood that there are a plurality of second object detection results 434 to 436 that do not overlap the plurality of first object detection results in region 440 in image 400. Note that a ratio of a region where second object detection result 434 overlaps region 440 to second object detection result 434 is lower than the predetermined ratio, and thus second object detection result 434 can be excluded as with the other second object detection results 437 to 439 not overlapping region 440. Also in a case of FIG. 11B, it is therefore understood that the second object detection results include two objects that are not detected in the first object detection results.

For example, determiner 130 may determine a ratio of the number of first object detection results overlapping second object detection results to the number of all the first object detection results as the degree of agreement, may determine the number of points in point clouds forming second object detection results overlapping first object detection results as the degree of agreement, or may determine a value obtained by dividing the number of the points in the point clouds forming the second object detection results overlapping first object detection results by the number of pixels forming the first object detection results as the degree of agreement. In a case where the ratio of the number of first object detection results overlapping second object detection results to the number of all the first object detection results is determined as the degree of agreement, the degree of agreement of the example illustrated in FIG. 11A is equal to the degree of agreement of the example illustrated in FIG. 11B.

Hence, since a region for determining the degree of agreement between the first object detection results and the second object detection results is narrowed to region 440 having a high probability that the objects to be detected are present, second object detection results 434 and 437 to 439 not involved in the object detection can be excluded from objects to be subjected to the determination of the degree of agreement. As a result, substantially the same degree of agreement can be obtained from the sensors regardless of whether the precisions of the sensors are high or low.

Determiner 130 is provided by, for example, processor 101, main memory 102, storage 103, and the like.

Selector 140 selects image data as the learning data for the object detection model according to the degree of agreement obtained by the determination by determiner 130. Specifically, in a case where the first object detection results do not agree with the second object detection results or in a case where the degree of agreement determined by determiner 130 is low, selector 140 selects image data being the sensing data, as the learning data for the object detection model. For example, when the degree of agreement obtained by the determination is lower than a predetermined value, selector 140 selects image data having the degree of agreement as the learning data for the object detection model, and when the degree of agreement is equal to or higher than the predetermined value, selector 140 need not select the image data having the degree of agreement as the learning data. Selector 140 therefore selects image data having a high degree of disagreement between the first object detection results and the second object detection results as the learning data, and thus image data that includes any error in at least one of a first object detection result and a second object detection result can be selected as the learning data. As a result, image data for performing an efficient machine learning can be selected.

In addition, selector 140 may select the second object detection results as correct data for learning the object detection model, according to the degree of agreement. That is, when a second object detection result based on point cloud data has a degree of agreement obtained by the determination equal to or higher than the predetermined value, selector 140 may select the second object detection result as the correct data and give the selected second object detection result to image data. This enables information processing apparatus 100 to automatically gives the second object detection result as the correct data to the image data in a case where the degree of agreement between the first object detection result and the second object detection result is equal to or higher than the predetermined value.

Selector 140 is provided by, for example, processor 101, main memory 102, storage 103, and the like.

[1-2. Operations]

Next, operations of information processing system 1 according to Embodiment 1 will be described.

FIG. 12 is a sequence diagram illustrating an example of operations performed in the information processing system.

First, in vehicle 200, detector 210 detects image data that is sensing data obtained through sensing by camera 205 of vehicle 200 and detects point cloud data that is sensing data obtained through sensing by LIDAR 206 of vehicle 200 (S11). The image data and the point cloud data detected by detector 210 are stored in memory 220.

Next, transmitter 230 of vehicle 200 transmits the image data and the point cloud data stored in memory 220 to information processing apparatus 100 over communication network 300 (S12).

In information processing apparatus 100, acquirer 110 acquires the image data and the point cloud data transmitted from vehicle 200 (S21).

Next, acquirer 110 of information processing apparatus 100 performs the detection process using the object detection model stored in memory 120 on the image data, so as to acquire a first object detection result, and performs the predetermined process on the point cloud data, so as to acquire a second object detection result (S22).

Determiner 130 of information processing apparatus 100 then determines a degree of agreement between the first object detection result and the second object detection result in a region in the sensing space of camera 205 and LIDAR 206 (S23).

Selector 140 of information processing apparatus 100 thereafter selects the image data as the learning data for the object detection model according to the degree of agreement determined by determiner 130 (S24).

Note that details of processes of steps S11, S12, and S21 to S24 performed by the processing units have been described in the description of the functional configuration of vehicle 200 and the functional configuration of information processing apparatus 100 with reference to FIG. 4 to FIG. 11B, and therefore description of the details will be omitted.

[1-3. Effects]

The information processing method according to the present embodiment includes: acquiring a first object detection result obtained by use of an object detection model to which image data from camera 205 is input and a second object detection result obtained by use of LIDAR 206; determining a degree of agreement between the first object detection result and the second object detection result in a specific region in a sensing space of camera 205 and LIDAR 206; and selecting the image data as learning data for the object detection model according to the degree of agreement obtained by the determination.

With this method, since the degree of agreement between the first object detection result and the second object detection result is determined in region R3 in the sensing space of camera 205 and LIDAR 206, and thus a degree of agreement between a first object detection result and a second object detection result in a region having a high probability that the objects to be detected in the object detection are present can be determined. This can prevent learning data from being selected due to objects not to be detected. As a result, learning data for detecting an intended object can be obtained easily even when a result of detection by the second sensor with a low precision is used.

Furthermore, in the information processing method according to this embodiment, the specific region may further be a region that is in accordance with an object to be detected in the object detection model. For this reason, the first object detection results and the second object detection results to be subjected to the determination of the degree of agreement can be narrowed reliably by using first object detection results and second object detection results included in a region that is in accordance with objects to be detected in the object detection model. This can prevent learning data from being selected due to objects not to be detected, more reliably.

Furthermore, in the information processing method according to this embodiment, the object to be detected may be a vehicle, and the region that is in accordance with the object to be detected may be a region corresponding to a road in the sensing space. For this reason, the first object detection results and the second object detection results to be subjected to the determination of the degree of agreement can be narrowed to first object detection results and second object detection results included in a region that is in accordance with the vehicle to be detected, that is, the region where the road is present. This can prevent learning data from being selected due to objects other than vehicles, more reliably.

Furthermore, in the information processing method according to this embodiment, the object to be detected may be a person, and the region that is in accordance with the object to be detected may be a region corresponding to a sidewalk in the sensing space. For this reason, the first object detection results and the second object detection results to be subjected to the determination of the degree of agreement can be narrowed to first object detection results and second object detection results included in a region that is in accordance with the person to be detected, that is, the region where the sidewalk is present. This can prevent learning data from being selected due to objects other than persons, more reliably.

In the information processing method according to the present embodiment, camera 205 and LIDAR 206 may be held in vehicle 200, the information processing method may further acquire map information and position information indicating the position of vehicle 200, and from the map information and the position information, a region determined to be a road or a sidewalk may be determined as the specific region used in the determination process. With this configuration, since the region determined to be a road or a sidewalk is specified from the map information and the position information indicating the position of vehicle 200, a region having a high possibility that a vehicle or a person to be detected is included in the region can be specified more reliably.

In the information processing method according to the present embodiment, camera 205 and LIDAR 206 may be held in vehicle 200, and the information processing method may further acquire image data and may use the image recognition on an image represented by the acquired image data to determine a region determined to be a road or a sidewalk as the specific region used in the determination process. With this configuration, since the region specified to be a road or a sidewalk is determined by performing image recognition on the image, a region having a high possibility that a vehicle or a person to be detected is included in the region can be specified based on an actual situation.

In the selection of the learning data in the information processing method according to the present embodiment, in a case where the first object detection results do not agree with the second object detection results, or in a case where the degree of agreement is low, image data being the sensing data is selected as the learning data for the object detection model. With this configuration, the sensing data that the object detection model is highly likely to fail to learn can be selected as the learning data.

Embodiment 2

Next, Embodiment 2 will be described with reference to FIG. 13 and FIG. 14.

Although information processing apparatus 100 according to Embodiment 1 is assumed to be a server outside vehicle 200, information processing apparatus 100 is not limited to this configuration and may be installed in vehicle 200A.

Figure 13:
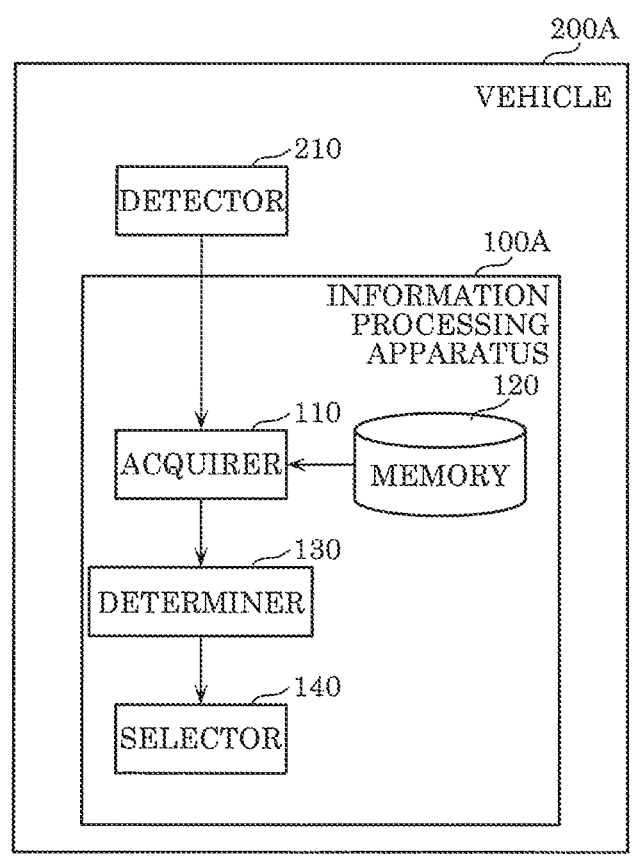
FIG. 13 is a diagram illustrating an example of a functional configuration of a vehicle according to Embodiment 2.

FIG. 13 is a diagram illustrating an example of a functional configuration of a vehicle according to Embodiment 2.

As illustrated in FIG. 13, vehicle 200A includes detector 210 and information processing apparatus 100A. Detector 210 is the same as that in Embodiment 1, and description of detector 210 will be omitted. Information processing apparatus 100A is different from information processing apparatus 100 according to Embodiment 1 in a point that the image data and the point cloud data are acquired directly from detector 210. The rest of a configuration of information processing apparatus 100A is the same as that of information processing apparatus 100, and description of the rest of the configuration will be omitted.

Figure 14:
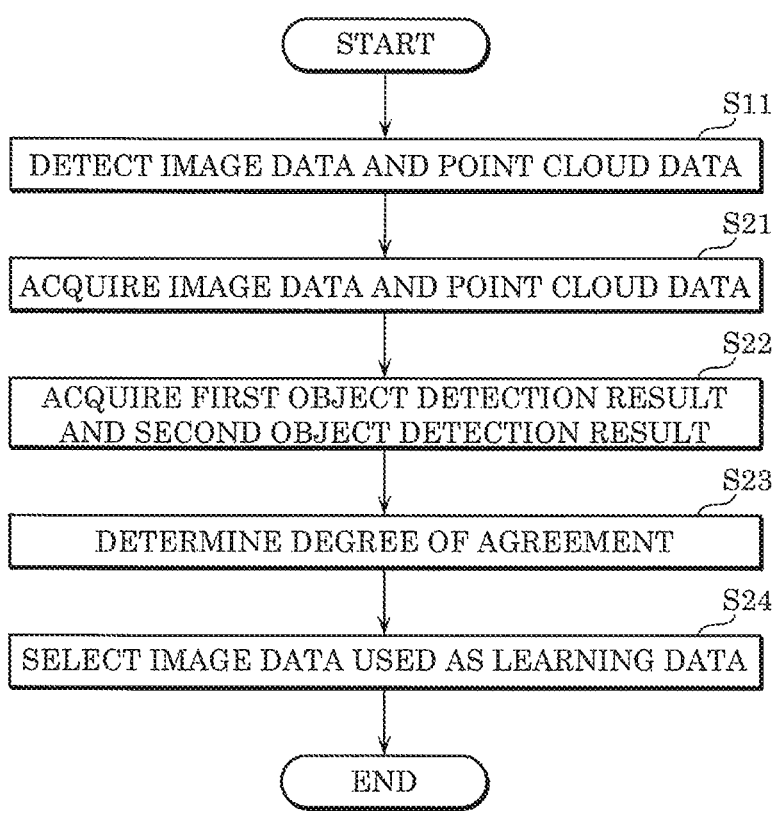
FIG. 14 is a flowchart illustrating an example of operations of the vehicle according to Embodiment 2.

FIG. 14 is a flowchart illustrating an example of operations of the vehicle according to Embodiment 2.

Operation of vehicle 200A according to Embodiment 2 is the same as the operation of information processing system 1 according to Embodiment 1 excluding step S12, and detailed description of the operation of vehicle 200A will be omitted.

Information processing apparatus 100A according to the present embodiment selects image data items to be the learning data, from among a plurality of image data items taken in vehicle 200A, and therefore, for example, only the selected image data items can be transmitted to an information processing apparatus such as an external server. As a result, a traffic from vehicle 200A to the external server can be reduced, and a communication load can be reduced.

Variations

Although information processing apparatus 100 or 100A according to Embodiment 1 or 2 described above uses camera 205 as the first sensor, but the configuration of information processing apparatus 100 or 100A is not limited to this, and detection data from a distance sensor different from the distance sensor adopted as the second sensor may be used. Information processing apparatuses 100 and 100A may adopt both the image data and the detection data from the LIDAR, as the sensing data. In addition, detection data from another optical sensor may be adopted as the sensing data. Note that in a case where the detection data from the distance sensor is used for the first sensor, acquirer 110 may acquire image data taken by a camera included in vehicle 200 other than the first sensor, determiner 130 may perform image recognition to specify the specific region used in the determination process on an image represented by the image data.

Note that although the second object detection results are assumed to be results obtained by performing the predetermined process on the point cloud data but are not limited to these and may be results obtained by performing the detection process on the point cloud data, using the object detection model for detecting objects from the point cloud data. In a case where the second sensor is not the LIDAR but another kind of distance sensor, the second object detection results may be results obtained by performing the detection process on data obtained by the other kind of distance sensor, using the object detection model for detecting objects from data obtained from the other kind of distance sensor.

In each of the above-described embodiments, the constituent components may be implemented in a form of dedicated hardware or by executing software programs adapted to the constituent components. The constituent components may be implemented by a program executing unit such as a CPU or a processor reading and executing a software program recorded in a recording medium such as a hard disk or a semiconductor memory. Here, software implementing the information processing method, the information processing apparatus, and the like in each of the above-described embodiments is the following program.

Specifically, the program causes a computer to execute an information processing method that includes: acquiring a first object detection result obtained by use of an object detection model to which sensing data from a first sensor is input, and a second object detection result obtained by use of a second sensor; determining a degree of agreement between the first object detection result and the second object detection result in a specific region in a sensing space of the first sensor and the second sensor; and selecting the sensing data as learning data for the object detection model, according to the degree of agreement obtained in the determining.

Although an information processing method, an information processing apparatus, and a recording medium according to one or more aspects of the present disclosure has been described based on exemplary embodiments above, the present disclosure is not limited to the exemplary embodiments described above. Other forms realized through various modifications to the embodiments conceived by a person of ordinary skill in the art or through a combination of the components in different embodiments described above, so long as they do not depart from the essence of the present disclosure, may be included in the scope in the one or more aspects of the present disclosure.

INDUSTRIAL APPLICABILITY

The present disclosure is useful as an information processing method, an information processing apparatus, and a recording medium that can obtain learning data for detecting an intended object even when a result of detection by a sensor with a low precision is used

What is claimed is:

1. An information processing method, comprising:
executing an object detection process using an object detection model to which sensing data from a first sensor that detects an environment of a moving body is input, wherein the object detection model is a model which has been trained by a machine learning;
acquiring (i) a first object detection result obtained by the object detection process using the object detection model and (ii) a second object detection result obtained by use of a second sensor that detects an environment of the moving body;
specifying a specific region included in a third sensing space where a first sensing space of the first sensor overlaps a second sensing space of the second sensor;
determining a degree of agreement between the first object detection result and the second object detection result in the specific region specified;
selecting the sensing data as learning data to further train the object detection model by the machine learning in a case where the first object detection result does not agree with the second object detection result or in a case where the degree of agreement is lower than a predetermined value; and
training the object detection model using the sensing data selected as the learning data,
wherein the first sensor is a camera installed in the moving body,
the first sensing space is a capturing range of the camera,
the sensing data is an image of the environment of the moving body within the capturing range, the image being captured by the camera,
the executing of the object detection process using the object detection model is detecting (i) an object in the image and (ii) a region where the object in the image is located,
the first object detection result includes a first information piece related to the region of the detected object in the image,
the second sensor is a distance sensor installed in the moving body,
the second sensing space is a detection range of the distance sensor,
the second object detection result includes a second information piece including a three-dimensional shape of a terrain including an object in an environment of the moving body within the detection range, the three-dimensional shape being detected by the distance sensor,
the specific region is a region corresponding to a road or a sidewalk in the third sensing space,
when the specific region is the road, an object to be detected by use of the object detection model is a vehicle,
when the specific region is the sidewalk, the object to be detected by use of the object detection model is a person,
the first object detection result includes a first region which the object to be detected occupies in the specific region,
the second object detection result includes a second region which the object to be detected occupies in the specific region, and
in the determining, a degree of overlap to which the first region overlaps the second region is determined as the degree of agreement.

2. The information processing method according to claim 1, further comprising:
selecting the second object detection result as correct data for learning the object detection model, according to the degree of agreement.

3. The information processing method according to claim 1, wherein the specific region is further a region that is in accordance with an object to be detected in the object detection model.

4. The information processing method according to claim 3, wherein
the object to be detected is a vehicle, and
the region that is in accordance with the object to be detected is a region corresponding to a road in the third sensing space.

5. The information processing method according to claim 3, wherein
the object to be detected is a person, and
the region that is in accordance with the object to be detected is a region corresponding to a sidewalk in the third sensing space.

6. The information processing method according to claim 1, wherein
the first sensor and the second sensor are installed in the moving body,
the information processing method further comprising:
acquiring map information and position information indicating a position of the moving body; and
determining, as the specific region, a region determined to be either a road or a sidewalk from the map information and the position information.

7. The information processing method according to claim 1, wherein
the first sensor and the second sensor are held in the moving body,
the information processing method further comprising:
acquiring an image; and
determining, as the specific region, a region determined to be either a road or a sidewalk, using image recognition on the acquired image.

8. An information processing apparatus, which is configured to:
execute an object detection process using an object detection model to which sensing data from a first sensor that detects an environment of a moving body is input, wherein the object detection model is a model which has been trained by a machine learning;
acquire (i) a first object detection result obtained by the object detection process using the object detection model and (ii) a second object detection result obtained by use of a second sensor that detects an environment of the moving body;
specify a specific region included in a third sensing space where a first sensing space of the first sensor overlaps a second sensing space of the second sensor;
determine a degree of agreement between the first object detection result and the second object detection result in the specific region specified; and
select the sensing data as learning data to further train the object detection model by the machine learning in a case where the first object detection result does not agree with the second object detection result or in a case where the degree of agreement is lower than a predetermined value; and
train the object detection model using the sensing data selected as the learning data,
wherein the first sensor is a camera installed in the moving body,
the first sensing space is a capturing range of the camera,
the sensing data is an image of the environment of the moving body within the capturing range, the image being captured by the camera,
the executing of the object detection process using the object detection model is detecting (i) an object in the image and (ii) a region where the object in the image is located,
the first object detection result includes a first information piece related to the region of the detected object in the image,
the second sensor is a distance sensor installed in the moving body,
the second sensing space is a detection range of the distance sensor,
the second object detection result includes a second information piece including a three-dimensional shape of a terrain including an object in an environment of the moving body within the detection range, the three-dimensional shape being detected by the distance sensor,
the specific region is a region corresponding to a road or a sidewalk in the third sensing space,
when the specific region is the road, an object to be detected by use of the object detection model is a vehicle,
when the specific region is the sidewalk, the object to be detected by use of the object detection model is a person,
the first object detection result includes a first region which the object to be detected occupies in the specific region,
the second object detection result includes a second region which the object to be detected occupies in the specific region, and
a degree of overlap to which the first region overlaps the second region is determined as the degree of agreement.

9. A non-transitory computer-readable recording medium that stores a program for causing a computer to execute an information processing method including:
executing an object detection process using an object detection model to which sensing data from a first sensor that detects an environment of a moving body is input, wherein the object detection model is a model which has been trained by a machine learning;
acquiring (i) a first object detection result obtained by the object detection process using the object detection model and (ii) a second object detection result obtained by use of a second sensor that detects an environment of the moving body;
specifying a specific region included in a third sensing space where a first sensing space of the first sensor overlaps a second sensing space of the second sensor;
determining a degree of agreement between the first object detection result and the second object detection result in the specific region specified;
selecting the sensing data as learning data to further train the object detection model by the machine learning in a case where the first object detection result does not agree with the second object detection result or in a case where the degree of agreement is lower than a predetermined value; and
training the object detection model using the sensing data selected as the learning data,
wherein the first sensor is a camera installed in the moving body,
the first sensing space is a capturing range of the camera,
the sensing data is an image of the environment of the moving body within the capturing range, the image being captured by the camera, the executing of the object detection process using the object detection model is detecting (i) an object in the image and (ii) a region where the object in the image is located, the first object detection result includes a first information piece related to the region of the detected object in the image, the second sensor is a distance sensor installed in the moving body, the second sensing space is a detection range of the distance sensor, the second object detection result includes a second information piece including a three-dimensional shape of a terrain including an object in an environment of the moving body within the detection range, the three-dimensional shape being detected by the distance sensor, the specific region is a region corresponding to a road or a sidewalk in the third sensing space, when the specific region is the road, an object to be detected by use of the object detection model is a vehicle, when the specific region is the sidewalk, the object to be detected by use of the object detection model is a person, the first object detection result includes a first region which the object to be detected occupies in the specific region, the second object detection result includes a second region which the object to be detected occupies in the specific region, and in the determining, a degree of overlap to which the first region overlaps the second region is determined as the degree of agreement.

10. The information processing method according to claim 1, wherein
the first sensor and the second sensor are installed in the moving body.

11. The information processing method according to claim 1, wherein
the degree of agreement is determined based on an extent to which the first object detection result overlaps the second object detection result in the specific region.

12. The information processing apparatus according to claim 8, wherein
the first sensor and the second sensor are installed in the moving body.

13. The information processing apparatus according to claim 8, wherein
the degree of agreement is determined based on an extent to which the first object detection result overlaps the second object detection result in the specific region.

14. The non-transitory computer-readable recording medium according to claim 9, wherein
the first sensor and the second sensor are installed in the moving body.

15. The non-transitory computer-readable recording medium according to claim 9, wherein
the degree of agreement is determined based on an extent to which the first object detection result overlaps the second object detection result in the specific region.

* * * * *